United States Patent
Kimura

(10) Patent No.: US 8,352,928 B2
(45) Date of Patent: Jan. 8, 2013

(54) PROGRAM CONVERSION APPARATUS, PROGRAM CONVERSION METHOD, AND COMPUTER PRODUCT

(75) Inventor: Shigeru Kimura, Kawasaki (JP)

(73) Assignee: Fujitsu Semiconductor Limited, Kanagawa (JP)

( * ) Notice: Subject to any disclaimer, the term of this patent is extended or adjusted under 35 U.S.C. 154(b) by 1166 days.

(21) Appl. No.: 12/219,864

(22) Filed: Jul. 29, 2008

(65) Prior Publication Data
US 2009/0083526 A1 Mar. 26, 2009

(30) Foreign Application Priority Data

Sep. 20, 2007 (JP) ................................. 2007-244312

(51) Int. Cl.
G06F 9/44 (2006.01)
G06F 9/45 (2006.01)

(52) U.S. Cl. ......... 717/145; 717/128; 717/154; 717/158
(58) Field of Classification Search ........................ None
See application file for complete search history.

(56) References Cited

U.S. PATENT DOCUMENTS

| | | | | |
|---|---|---|---|---|
| 5,715,440 A * | 2/1998 | Ohmura et al. | ............... | 712/233 |
| 5,857,104 A * | 1/1999 | Natarjan et al. | ............... | 717/158 |
| 5,933,628 A * | 8/1999 | Chang | ........................... | 712/233 |
| 5,970,244 A * | 10/1999 | Nagahashi et al. | ........... | 717/124 |
| 6,035,122 A * | 3/2000 | Ando | ........................... | 717/155 |
| 6,115,809 A * | 9/2000 | Mattson et al. | ............... | 717/158 |
| 6,205,545 B1 * | 3/2001 | Shah et al. | ..................... | 712/237 |
| 7,055,070 B1 * | 5/2006 | Uhler et al. | ..................... | 717/128 |
| 7,168,066 B1 * | 1/2007 | Thekkath et al. | ............. | 717/128 |
| 7,178,133 B1 * | 2/2007 | Thekkath | ....................... | 717/128 |
| 7,181,728 B1 * | 2/2007 | Thekkath | ....................... | 717/128 |
| 7,185,234 B1 * | 2/2007 | Thekkath | ....................... | 717/128 |
| 2001/0003822 A1 | 6/2001 | Hibi et al. | | |
| 2002/0066081 A1 * | 5/2002 | Duesterwald et al. | ........ | 717/128 |
| 2003/0005422 A1 * | 1/2003 | Kosche et al. | ................. | 717/154 |
| 2003/0101436 A1 * | 5/2003 | Kobrosly et al. | ............. | 717/128 |
| 2007/0089095 A1 * | 4/2007 | Thekkath et al. | ............. | 717/128 |

FOREIGN PATENT DOCUMENTS

JP 57-124088 8/1982

(Continued)

OTHER PUBLICATIONS

Azam Beg et al., Modeling of Trace- and Block-Based Caches, Journal of Circuits, Systems and Computers, vol. 16, No. 5, Mar. 2007, [Retrieved on Oct. 4, 2012]. Retrieved from the internet: <URL:http://www.worldscientific.com/doi/pdf/10.1142/S0218126607003940> 19 Pages (711-729).*

(Continued)

Primary Examiner — Don Wong
Assistant Examiner — Anibal Rivera
(74) Attorney, Agent, or Firm — Staas & Halsey LLP

(57) ABSTRACT

A linker generates a simulator-use executable format program from a pre-conversion object program and a simulator-use object program. A simulator executes the simulator-use object program and acquires branch trace information. A binary program converting tool, based on the branch trace information and a branch penalty table, generates a post-conversion object program having a rewritten branching prediction bit of the pre-conversion object program. Another linker generates an actual-machine-use executable format program from the post-conversion object program and an actual-machine-use object program.

18 Claims, 16 Drawing Sheets

FOREIGN PATENT DOCUMENTS

| | | |
|---|---|---|
| JP | 62-214444 | 9/1987 |
| JP | 3-278241 | 12/1991 |
| JP | 10-187460 | 7/1998 |
| JP | 2001-273138 | 10/2001 |
| JP | 2005-92532 | 4/2005 |
| JP | 2006-155671 | 6/2006 |

OTHER PUBLICATIONS

James E. Smith, A study of Branch Prediction Strategies, Control Data Corporation, IEEE 1981, [Retrieved on Oct. 4, 2012]. Retrieved from the internet: <URL: http://dl.acm.org/citation.cfm?id=285980> 14 Pages (202-215).*

Ravi Nair, Dynamic Path-Based Branch Correlation, IBM Thomas J. Watson Research Center, IEEE 1995, [Retrieved on Oct. 4, 2012]. Retrieved from the internet: <URL: http://dl.acm.org/citation.cfm?id=225168> 9 Pages (15-23).*

Japanese Office Action mailed May 22, 2012 issued in corresponding Japanese Patent Application No. 2007-244312.

* cited by examiner

FIG.5

| BRANCH INSTRUCTION CODE | XX | IMMEDIATE DATA |
|---|---|---|

BRANCHING PREDICTION BIT (2-BIT)
00,01 : BRANCH PREDICTED NOT TAKEN
10,11 : BRANCH PREDICTED TAKEN

FIG.6

```
                                    ,21
0x00200020   Bne   icc0,#3,label1
   ...
0x00200048   Beq   icc1,#0,label2
   ...
0x00200068   Bge   icc2,#0,label3
```

FIG.7

| ADDRESS | FUNCTION NAME | BRANCH TAKEN | BRANCH NOT TAKEN |
|---|---|---|---|
| 0x00200020 | main | 4 | 12 |
| 0x00200048 | sub | 120 | 2 |
| 0x00200068 | sub | 10 | 2 |

FIG.8

| FLAG | BRANCH PENALTY | |
|---|---|---|
| | BRANCH NOT TAKEN | BRANCH TAKEN |
| T(10,11) | 3 | 1 |
| F(00,01) | 0 | 3 |

FIG.9

```
0x00200020    Bne   icc0,#0,label1
...
0x00200048    Beq   icc1,#3,label2
...
0x00200068    Bge   icc2,#3,label3
```

FIG.10

APPLICABLE OBJECT PROGRAM : a.obj

| UPDATE | ADDRESS (RELATIVE ADDRESS) | | BRANCHING PREDICTION BIT | | BRANCH TAKEN | BRANCH NOT TAKEN | NAME |
|---|---|---|---|---|---|---|---|
| | | | BEFORE CONVERSION | AFTER CONVERSION | | | |
| U | 0 x00000010 | bicc | 3 | 0 | 10 | 16 | main |
| | 0 x00000024 | bctl | 0 | 0 | 1 | 2 | sub |
| U | 0 x00000044 | bicc | 0 | 3 | 1608 | 5 | sub |

APPLICATION RATE : 79.67 (%)

NUMBER OF REWRITTEN BRANCHES : 98

NUMBER OF APPLICABLE BRANCHES : 123

| | BRANCH PENALTY | 28 |
|---|---|---|
| FLAG | BRANCH NOT TAKEN | BRANCH TAKEN |
| T | P(T:n) | P(T:t) |
| F | P(F:n) | P(F:t) |

FIG.13

| | ADDRESS | FUNCTION NAME | BRANCH TAKEN | BRANCH NOT TAKEN |
|---|---|---|---|---|
| P1 | 0xXXXXXXXX | ... | P1(t) | P1(n) |
| P2 | 0xXXXXXXXX | ... | P2(t) | P2(n) |
| ... | | | | |
| Pn | 0xXXXXXXXX | ... | Pn(t) | Pn(n) |

FIG.16

FIRST BRANCH TRACE INFORMATION
(WEIGHTING COEFFICIENT C1 = 1) 24

| ADDRESS | FUNCTION NAME | BRANCH TAKEN | BRANCH NOT TAKEN |
|---|---|---|---|
| 0x00200020 | main | 4 | 12 |
| 0x00200048 | sub | 120 | 2 |
| 0x00200068 | sub | 10 | 2 |

SECOND BRANCH TRACE INFORMATION
(WEIGHTING COEFFICIENT C2 = 2) 25

| ADDRESS | FUNCTION NAME | BRANCH TAKEN | BRANCH NOT TAKEN |
|---|---|---|---|
| 0x00200020 | main | 10 | 12 |
| 0x00200048 | sub | 100 | 25 |
| 0x00200068 | sub | 2 | 36 |

BRANCH TRACE INFORMATION AFTER MERGING 27

| ADDRESS | FUNCTION NAME | BRANCH TAKEN | BRANCH NOT TAKEN |
|---|---|---|---|
| 0x00200020 | main | 24 | 36 |
| 0x00200048 | sub | 320 | 52 |
| 0x00200068 | sub | 14 | 74 |

PROGRAM CONVERSION APPARATUS, PROGRAM CONVERSION METHOD, AND COMPUTER PRODUCT

CROSS-REFERENCE TO RELATED APPLICATIONS

This application is based upon and claims the benefit of priority from the prior Japanese Patent Application No. 2007-244312, filed on Sep. 20, 2007, the entire contents of which are incorporated herein by reference.

BACKGROUND OF THE INVENTION

1. Field

The embodiments relate to rewriting a branching prediction bit of a binary program.

2. Description of the Related Art

Recently, to prevent disorder of processing sequences in pipeline processing work flows, pipeline processing computers implement a function of predicting whether a conditional branch will be taken. A computer with this function, when executing a branch instruction where the branch is predicted to be taken, pre-fetches a subsequent group of instructions under the assumption that the branching condition has been met. If the prediction is wrong, the computer discards the group of instructions pre-fetched and newly pre-fetches a group of instructions for the case where the branching condition has not been met and accordingly, extra time, namely, branch penalty, is caused.

Branch predicting functions include a static branch predicting function of explicitly specifying a branching direction from software. Regarding this static branch predicting function, a binary program converting apparatus is known that converts a binary program to the binary program to be executed by a computer with a branch predicting unit.

FIG. 20 is a diagram of a configuration of a conventional binary program converting apparatus. As shown in FIG. 20, this binary program converting apparatus comprises a binary program converting tool 4 and a tracer 2. In advance, the tracer 2 executes a pre-conversion binary program 1 composed of plural instruction blocks and generates trace information 3 based on execution information collected from such execution. The trace information 3 is the result of totaling, according to binary programs or instruction blocks, an operation history (trace information) extracted at the time of execution of the pre-conversion binary program 1.

The instruction block is a part of the binary program partitioned by control transfer instructions such as the branch instruction, a jump instruction, and a call instruction or a block defined by partitioning a program area so that the head becomes a label as a branch destination of the branch instruction. The binary program converting tool 4, upon receipt of the trace information 3, generates a post-conversion binary program 5 from the pre-conversion binary program 1.

In such a conversion, the binary program converting tool 4 changes the arrangement of the instruction blocks so that, when the computer has a characteristic of predicting branching execution probability to be low with respect to the branch instruction to an address in the upward direction (or downward direction), the branch instruction having a low frequency of branching will be the branch instruction to the address in the upward direction (or downward direction) and the branch instruction having a high frequency of branching will be the branch instruction to the address in the downward direction (upward direction). The binary program converting tool 4 also changes the arrangement of the instruction blocks so that, with respect to the branch instruction having a high frequency of branching, a part corresponding to the instruction block before the branching and a part corresponding to the instruction block after the branching will be continuous with each other, such as that disclosed in Japanese Patent Application Laid-Open Publication No. 2001-273138, paragraphs [0011] to [0020] and [0038].

However, the conventional technology disclosed in Japanese Patent Application Laid-Open Publication No. 2001-273138 has the following problems. Firstly, since a sequence of instructions is replaced with another sequence of instructions and the instruction block is caused to move, instruction code length is increased or decreased and code size is expanded in some cases. For this reason, this technology is not suitable for a built-in system for which restriction on capacity size is severe. Secondly, in the case of the built-in system, the trace information is acquired by a simulator. Usually, since an executable format program to be executed on the simulator is different from the executable format program to be executed on a device in which the built-in system is actually incorporated (hereinafter, actual machine), the trace information obtained by the simulator may not be directly used for processing the executable format program for the actual machine.

Thirdly, since consideration is not given to a case where there are plural execution paths for the same branch instruction, it is not clear from which execution path the trace information obtained should be used in preparing or processing the program corresponding to the branch predication. Fourthly, the criteria for judging whether the branch is taken in the branch instruction are based on the number of times the branch has been taken at the time of the program execution to obtain the trace information and do not reflect the branch penalty. Therefore, though the hit rate of the branch prediction is high, there are cases where the branch penalty is not sufficiently decreased.

SUMMARY

According to one aspect of an embodiment, a program converting apparatus includes a data acquisition unit that executes a first executable format program generated using a pre-conversion object program and acquires branch trace information concerning branch-taking with respect to a conditional branch instruction; a converting unit that, based on the branch trace information, generates a post-conversion object program, where a branching prediction bit of the conditional branch instruction of the pre-conversion object program is rewritten; and a generating unit that generates a second executable format program, using the post-conversion object program.

According to another aspect of the embodiment, a program converting method includes generating a post-conversion object program, based on branch trace information concerning branch-taking with respect to a conditional branch instruction, where a branching prediction bit of a conditional branch instruction of a pre-conversion object program is rewritten; and generating an executable format program, using the post-conversion object program.

BRIEF DESCRIPTION OF THE DRAWINGS

FIG. 5 is a schematic of a branching prediction bit of a conditional branch instruction;

FIG. 6 is a schematic of an example of a pre-conversion object program;

FIG. 7 is a schematic of an example of branch trace information;

FIG. 8 is a schematic of an example of a branch penalty table;

FIG. 9 is a schematic of an example of a post-conversion object program;

FIG. 10 is a schematic of an example of statistical information;

FIG. 12 is a diagram of the branch penalty table for explaining a rewriting processing procedure;

FIG. 13 is a diagram of the branch trace information explaining the rewriting processing procedure;

FIG. 16 is a schematic of an example of merging the branch trace information;

DETAILED DESCRIPTION OF THE PREFERRED EMBODIMENTS

Referring to the accompanying drawings, exemplary embodiments according to the present invention are explained in detail below. Here, description is made mainly of a case of obtaining branch trace information concerning a branch taken/not taken situation of a conditional branch instruction on a simulator.

Figure 1:
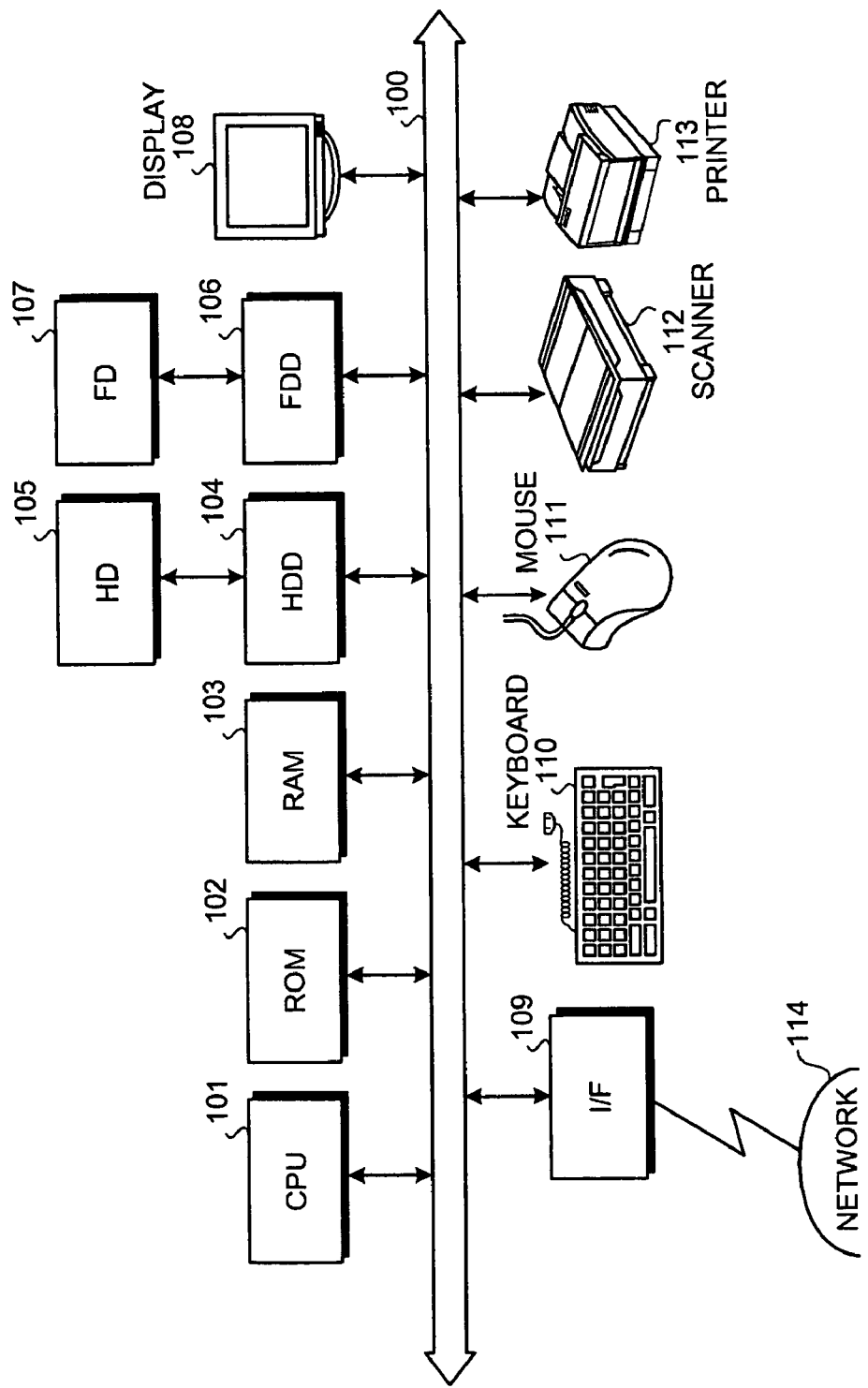
FIG. 1 is a block diagram of a program converting apparatus according to an embodiment of the present invention.

FIG. 1 is a block diagram of a program converting apparatus according to an embodiment of the present invention. As shown in FIG. 1, the program converting apparatus includes a central processing unit (CPU) 101, a read-only memory (ROM) 102, a random access memory (RAM) 103, a hard disc drive (HDD) 104, a hard disc (HD) 105, a flexible disc drive (FDD) 106, a flexible disc (FD) 107 as an example of a removal recording medium, a display 108, an interface (I/F) 109, a keyboard 110, a mouse 111, a scanner 112, and a printer 113. These component units are connected to one another by way of a bus 100.

The CPU 101 governs overall control of the program converting apparatus. The ROM 102 stores programs such as a boot program. The RAM 103 is used as a work area of the CPU 101. The HDD 104, under the control of the CPU 101, controls reading/writing of data from or to the HD 105. The HD 105 stores the data written under control of the HDD 104.

The FDD 106, under the control of the CPU 101, controls reading/writing of data from or to the FD 107. The FD 107 stores the data written under control of the FDD 106 and has the data stored in the FD 107 read by the program converting apparatus.

A removal recording medium may be, besides the FD 107, a compact disk read-only memory (CD-ROM), compact disk-recordable (CD-R), a compact disk-rewritable (CD-RW), a magneto optical disk (MO), a Digital Versatile Disc (DVD), or a memory card. The display 108 displays a cursor, an icon, a tool box, and data such as document, image, and function information. The display 108 may be, for example, a cathode ray tube (CRT), a thin-film-transistor (TFT) liquid crystal display, or a plasma display.

The I/F 109 is connected to a network 114 such as Internet through a telecommunication line and is connected to other devices by way of the network 114. The I/F 109 serves as an interface between the network 114 and the inside of the apparatus and controls the input and output of data from or to external devices. The I/F 109 may be, for example, a modem or a local area network (LAN) adapter.

The keyboard 110 is equipped with keys for the input of characters, numerals, and various instructions, and data is entered through the keyboard 110. The keyboard 110 may be a touch-panel input pad or a ten-key keypad. The mouse 111 performs cursor movement, range selection, and movement, size change, etc., of a window. The mouse 111 may be a trackball or a joystick if it has similar functions as a pointing device.

The scanner 112 optically reads an image and takes in the image data into the program converting apparatus. The scanner 112 may have an optical character recognition (OCR) function as well. The printer 113 prints image data and document data. The printer 113 may be, for example, a laser printer or an ink jet printer.

Figure 2:
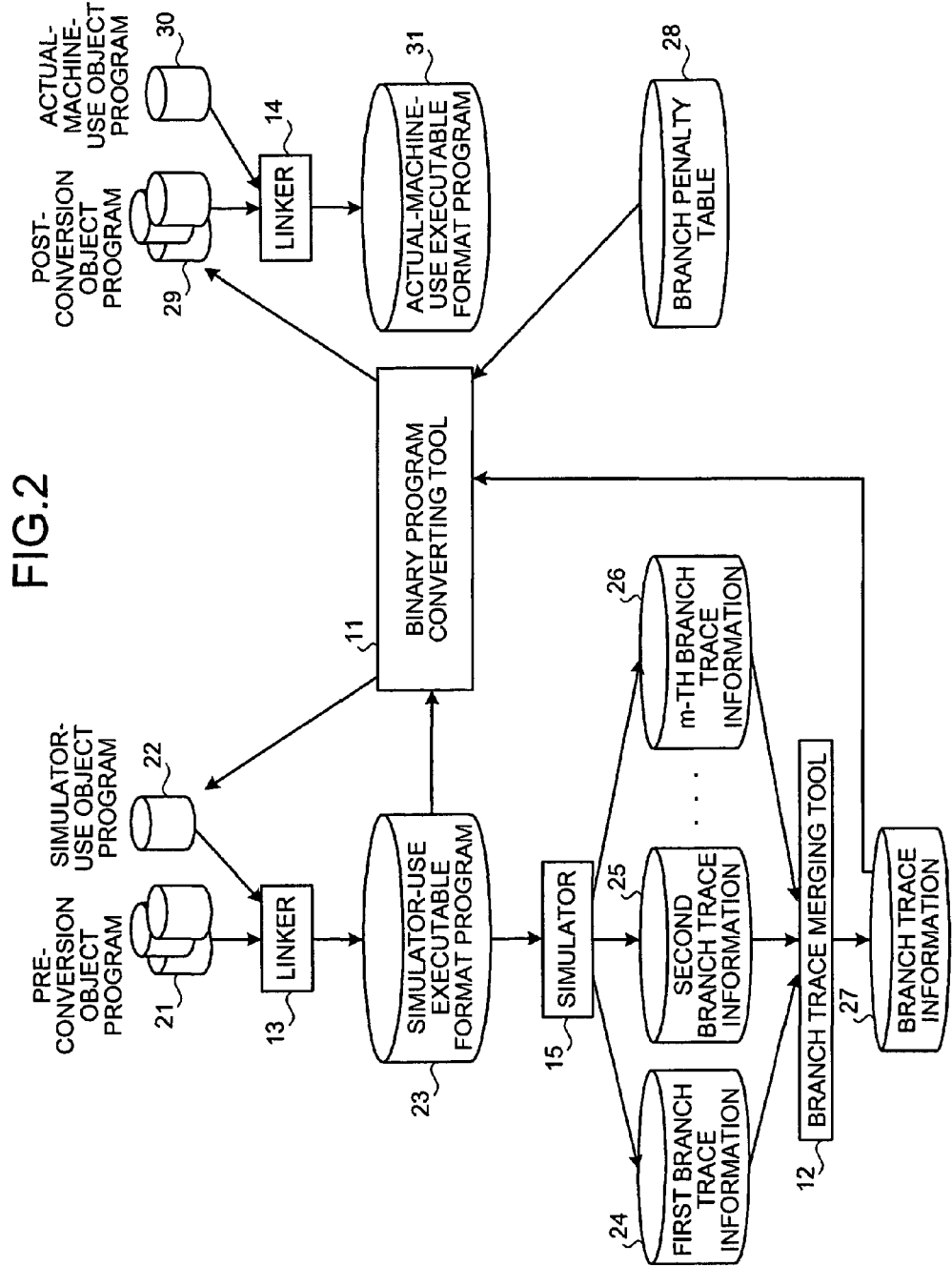
FIG. 2 is a diagram of a functional configuration of the program converting apparatus.

FIG. 2 is a diagram of a functional configuration of the program converting apparatus according to the embodiment. As shown in FIG. 2, the program converting apparatus includes a binary program converting tool 11, a branch trace merging tool 12, linkers 13 and 14, and a simulator 15. The linker 13, by linking a pre-conversion object program 21 and a simulator-use object program 22, generates a simulator-use executable format program 23.

The simulator 15 functions as a branch trace information acquiring unit and, by executing the simulator-use executable format program, generates branch trace information. When the simulator-use executable format program 23 has a conditional branch instruction with plural execution paths, the simulator 15 outputs first branch trace information 24, second branch trace information 25, and m-th branch trace information 26 for a first execution path, a second execution path, and an m-th execution path, respectively, where m is an integer of 2 or more. The branch trace merging tool 12, by merging the first branch trace information 24, the second branch trace information 25, and the m-th branch trace information 26, generates final branch trace information 27.

The binary program converting tool 11 generates, based on the simulator-use executable format program 23, the branch trace information 27 and a branch penalty table 28, a post-conversion object program 29 that has a rewritten branching prediction bit of a conditional branch instruction of the pre-conversion object program 21. The linker 14 functions as an executable format program generating unit and, by linking the post-conversion object program 29 and an actual-machine-use object program 30, generates an actual-machine-use executable format program 31 to be executed on the actual machine into which the built-in system is incorporated.

The binary program converting tool 11, the branch trace merging tool 12, the linkers 13 and 14, and the simulator 15 realize respective functions specifically, for example, by the CPU 101 executing a program recorded on a recording medium such as the ROM 102, the RAM 103, and the HD 105 shown in FIG. 1 or by the I/F 109.

Figure 3:
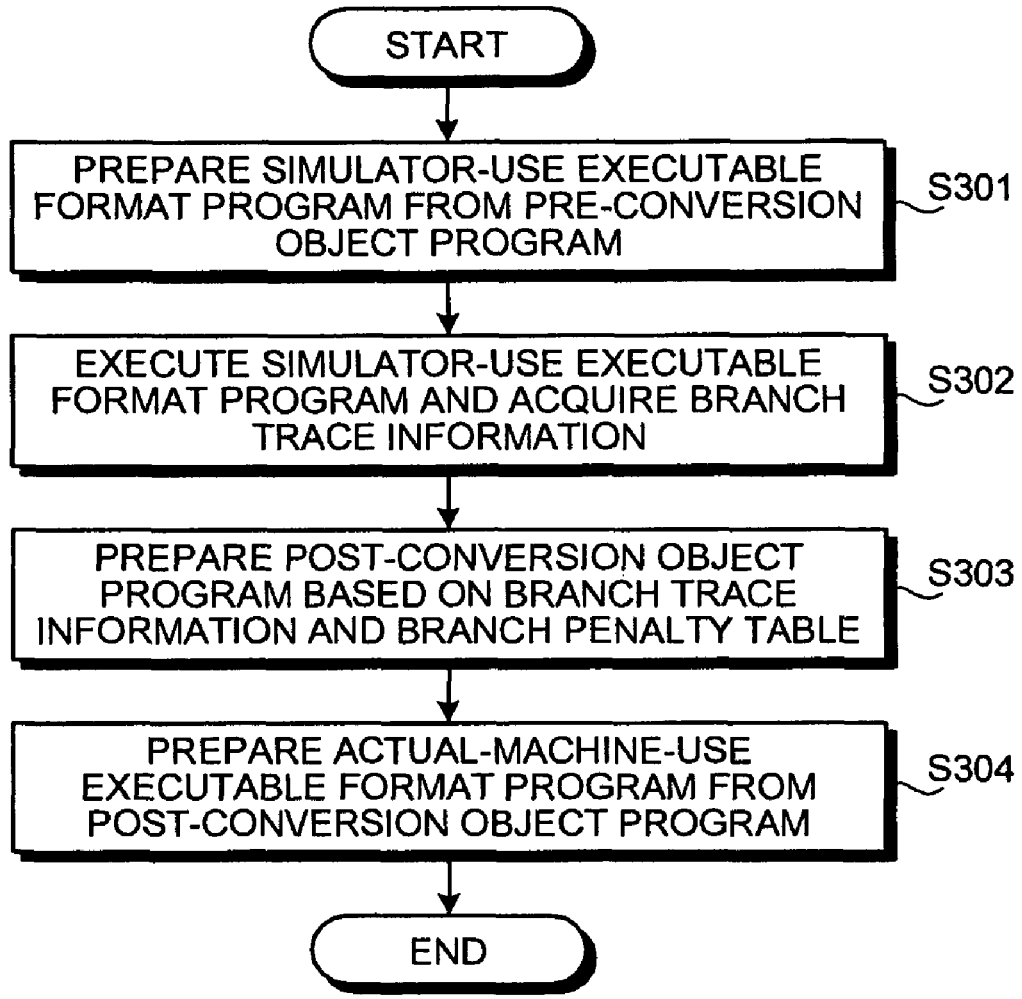
FIG. 3 is a flowchart of a processing procedure of the program converting apparatus.

FIG. 3 is a flowchart of a processing procedure of the program converting apparatus according to the embodiment. As shown in FIG. 3, when program conversion processing starts, the linker 13, by linking the pre-conversion object program 21 and the simulator-use object program 22, generates the simulator-use executable format program 23 (step S301).

The simulator 15 executes the simulator-use executable format program 23 and obtains the branch trace information 27 (step S302). As described above, when the conditional branch instruction has plural execution paths, the branch trace information 27 is obtained by the branch trace merging tool 12 merging the branch trace information 24, 25, and 26 obtained for the execution paths, respectively.

The binary program converting tool 11, based on the branch trace information 27 and the branch penalty table 28, rewrites the branching prediction bit of the conditional branch instruction of the pre-conversion object program 21 and prepares the post-conversion object program 29 (step S303). The linker 14, by linking the post-conversion object program 29 and the actual-machine-use object program 30, prepares the actual-machine-use executable format program 31 (step S304). As described above, the actual-machine-use executable format program 31, in which the branching prediction bit of the conditional branch instruction rewritten, is obtained.

Figure 4:
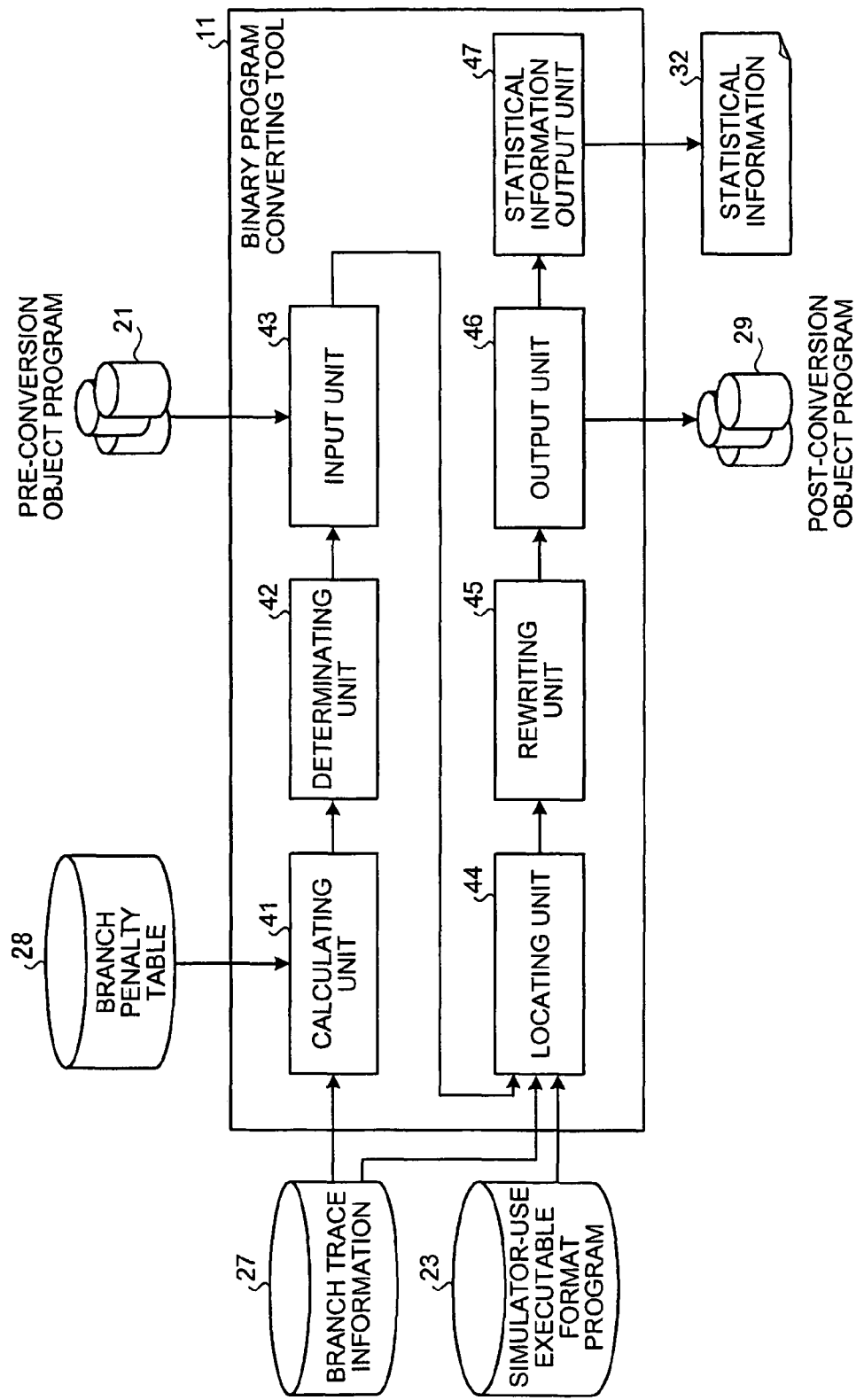
FIG. 4 is a diagram of a configuration of a binary program converting tool according to the embodiment.

FIG. 4 is a diagram of a configuration of the binary program converting tool. As shown in FIG. 4, the binary program converting tool 11 includes a calculating unit 41, a determining unit 42, an input unit 43, a locating unit 44, a rewriting unit 45, an output unit 46, and a statistical-information output unit 47. The calculating unit 41, based on the branch trace information 27 and the branch penalty table 28, calculates a total branch penalty difference for each conditional branch instruction. The total branch penalty difference is used as an index in determining whether the branching prediction bit must be rewritten.

The determining unit 42, based on the total branch penalty difference and for each conditional branch instruction, determines whether to rewrite the branching prediction bit. The input unit 43 accepts an input of the pre-conversion object program 21. The locating unit 44, based on the simulator-use executable format program 23 and the branch trace information 27, identifies an address of the conditional branch instruction in the pre-conversion object program 21, for each branch instruction.

The rewriting unit 45 rewrites the branching prediction bit of the conditional branch instruction for which the branching prediction bit has been determined to be rewritten by the determining unit 42. The object of rewriting is the conditional branch instruction at the address identified by the locating unit 44. The output unit 46 outputs the post-conversion object program 29 having the rewritten branching prediction bit. The statistical-information output unit 47 outputs statistical information 32 concerning locations at which the branching prediction bit has been rewritten.

FIG. 5 depicts an example in which the branching prediction bit of the conditional branch instruction is 2-bit. In this example, the value of the branching prediction bit is set at the binary number 10 (decimal number 2) or binary number 11 (decimal number 3) when the branch is predicted to be taken and at binary number 00 (decimal number 0) or binary number 01 (decimal number 1) when the branch is predicted to not be taken. The conditional branch instruction is translated by a compiler or assembler to a machine language.

FIG. 6 depicts an example of the pre-conversion object program 21. As shown in FIG. 6, the figure immediately following the # (0 or 3) is the value expressed by a decimal number of the branching prediction bit. Therefore, #3 after an address 0x00200020 on the first line indicates that the value of the branching prediction bit is binary number 11 and that the branch is predicted to be taken.

FIG. 7 depicts an example of the branch trace information 27. As shown in FIG. 7, at the time of execution on the simulator 15, with respect to the conditional branch instruction at the address 0x00200020 of the pre-conversion object program 21 shown in FIG. 6, the branch has been taken 4 times and the branch has not been taken 12 times.

FIG. 8 depicts an example of the branch penalty table 28. In the example shown in FIG. 8, where the branch is predicted to be taken (flag: T), the branch penalty of 3 occurs when the branch is not taken and the branch penalty of 1 occurs when the branch is taken. On the other hand, where the branch is predicted to not be taken (flag: F), the branch penalty of 3 occurs when the branch is taken and no branch penalty occurs when the branch is not taken. Respective values of the branch penalty depend on the processor. Here, the flag is set at T when the value of the branching prediction bit is binary number 10 or 11 and is set at F when the value is binary number 00 or 01.

FIG. 9 depicts an example of the post-conversion object program 29. In the example shown in FIG. 9, each branching prediction bit (enclosed by a square in FIG. 9) is rewritten at the addresses 0x00200020, 0x00200048, and 0x00200068 of the pre-conversion object program 21 shown in FIG. 6.

FIG. 10 depicts an example of the statistical information 32. As shown in FIG. 10, information obtained as the statistical information 32 indicates that an applicable object program a.obj has 123 conditional branch instructions; among the conditional branch instructions, 98 of the branching prediction bits have been rewritten; and the rewriting rate is 79.67%. In FIG. 10, "U" in an update column indicates that the branching prediction bit has been rewritten.

Figure 11:
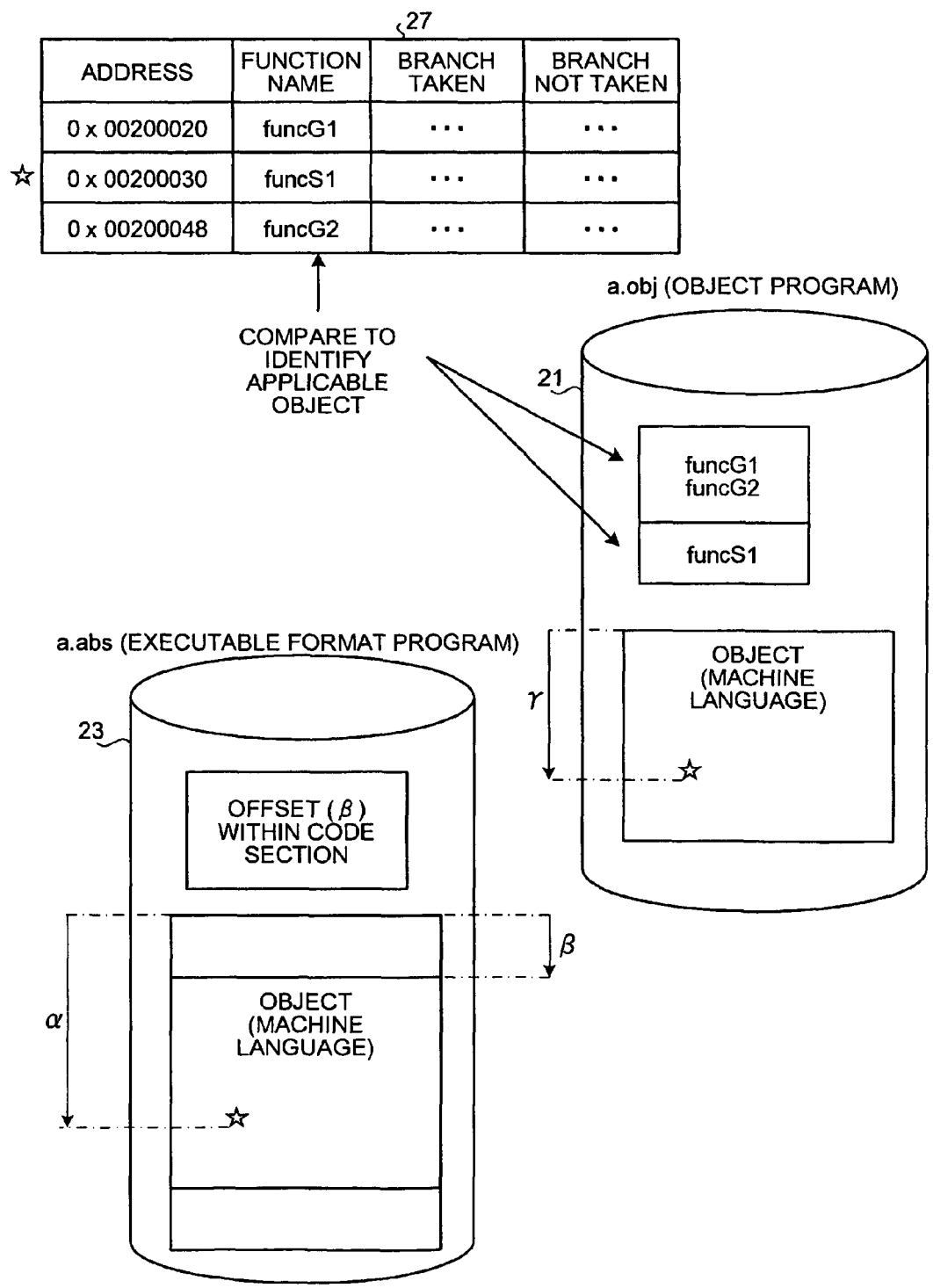
FIG. 11 is a diagram of address identifying processing by a locating unit.

FIG. 11 is a diagram of address identifying processing by the locating unit 44. As shown in FIG. 11, the branch trace information 27 is obtained by executing the simulator-use executable format program (a.abs) 23 on the simulator 15. Here, description is made taking, as an example, the case of identifying the address in pre-conversion object program (a.obj) 21, with respect to the branch instruction of the function name funcS1 (indicated by a star mark in the branch trace information 27) at the address 0x00200030.

The address (given as α) obtained as the branch trace information 27 is a logical address in the simulator space (indicated by the star mark on the simulator-use executable format program 23) and does not correspond to the address of the branch instruction in the object program. Accordingly, a relative address of the object program corresponding to this branch instruction from the head within a code section, namely, an offset address (given as β), is obtained. Generally, the executable format program stores an object program name and the relative address from the head within the code section. For example, in Executable and Linking Format (ELF) that is among the most standard executable format programs, such information is stored in a symbol table. Storage in the code section is typically the case regardless of the standard of the executable format program.

From these addresses α and β, the address (given as γ) of the branch instruction in the pre-conversion object program 21 is obtained (indicated by the star mark in the pre-conversion object program 21). The address γ may be obtained by the following equation (1). The locating unit 44 confirms whether the instruction at the address γ of the pre-conversion object program is the branch instruction. When the instruction at the address γ is not the branch instruction, the locating unit 44 generates an error.

$$\gamma = \alpha - \beta \quad (1)$$

Figure 14:
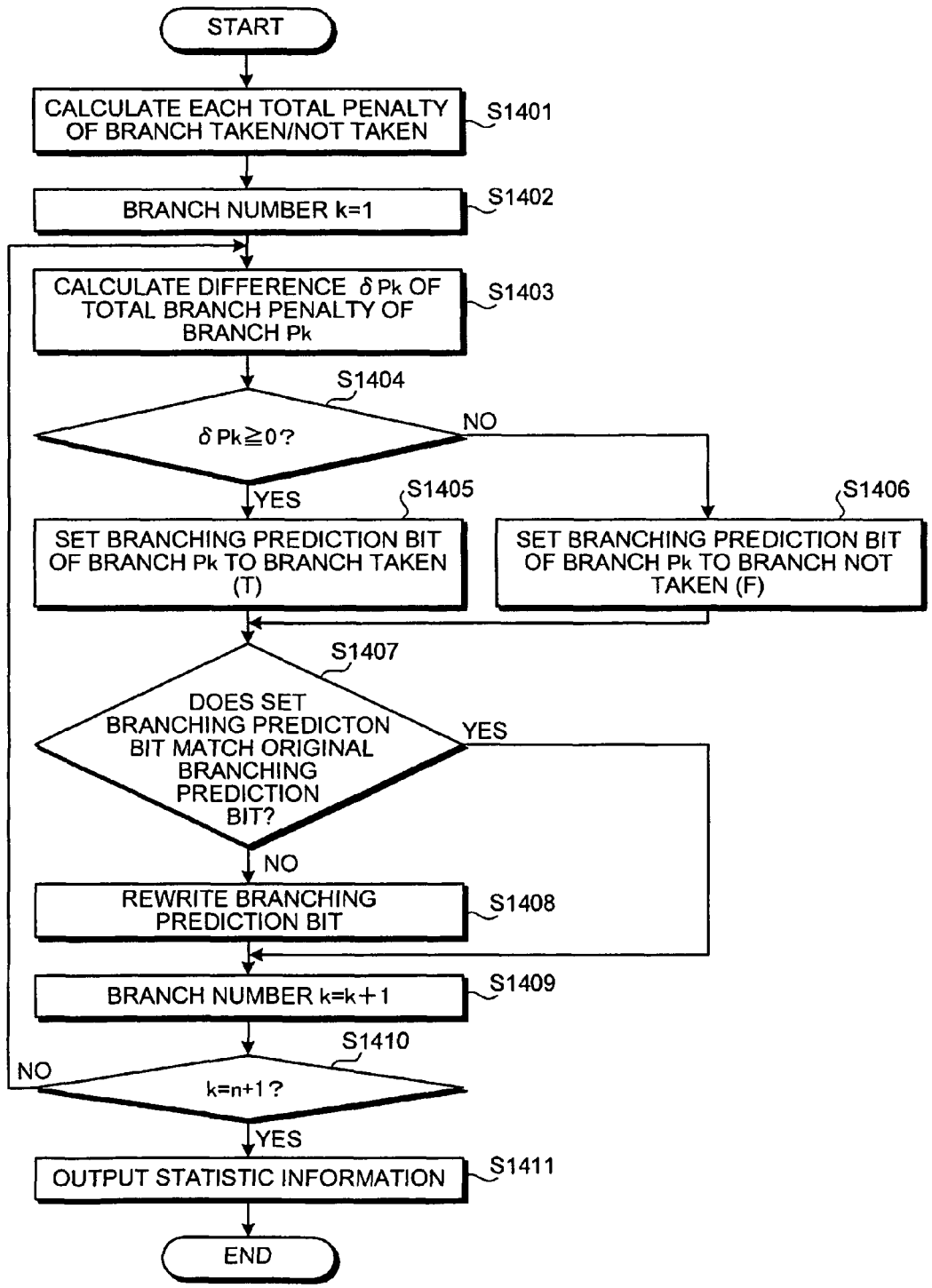
FIG. 14 is a flowchart of the rewriting processing procedure.

With reference to FIGS. 12 to 14, a processing procedure for rewriting the branching prediction bit is explained. FIG. 12 is a diagram of the branch penalty table. As shown in FIG. 12, when the branch is predicted to be taken (flag: T), the branch penalty for the case of the branch not being taken is given as P(T:n) and the branch penalty for the case of the branch being taken is given as P(T:t). On the other hand, when the branch is predicted to not be taken (flag: F), the branch penalty for the case of the branch not being taken is given as P(F:n) and the branch penalty for the case of the branch being taken is given as P(F:t).

FIG. 13 is a diagram of the branch trace information. As shown in FIG. 13, the branch number of obtained branch trace information 27 is given as k (k is a natural number from 1 to n), the branch instruction is expressed as Pk, using this branch number k, and the number of times the branch instruction Pk is taken and the number of times the branch instruction Pk is not taken, are given as Pk(t) and Pk(n), respectively.

FIG. 14 is a flowchart of the processing procedure for rewriting the branching prediction bit. As shown in FIG. 14, with the start of the branching prediction bit rewriting processing, the calculating unit 41 calculates, based on the branch penalty table 28, a total penalty P(T) for the case of predicting that the branch is taken and a total penalty P(F) for the case of predicting that the branch is not taken (step S1401). The P(T) and the P(F) can be calculated by the following equations (2) and (3), respectively.

$$P(T) = P(T{:}n) \times Pk(n) + P(T{:}t) \times Pk(t) \quad (2)$$

$$P(F) = P(F{:}n) \times Pk(n) + P(F{:}t) \times Pk(t) \quad (3)$$

With the branch number k set to 1 (step S1402), the calculating unit 41 calculates, based on the number of times the branch is taken Pk(t) and the number of times the branch is not taken Pk(n) at the branch instruction Pk, the total branch penalty difference (δPk) (step S1403). The δPk may be calculated by the following equation (4).

$$\delta Pk = P(F) - P(T) \quad (4)$$

The determining unit 42 determines whether the δPk is equal to or greater than 0 (step S1404). If the δPk is equal to or greater than 0 (step S1404: YES), the branching prediction bit of the branch instruction Pk is set as the branch taken (flag: T) (Step S1405). If the δPk is smaller than 0 (step S1404: NO), the branching prediction bit of the branch instruction Pk is set as the branch not taken (flag: F) (Step S1406).

The rewriting unit 45 determines whether the branching prediction bit set at step S1405 or step S1406 and the original branching prediction bit of the branch instruction Pk match (step S1407). If the branching prediction bits do not match (step S1407: NO), then the branching prediction bit of the branch instruction Pk of the pre-conversion object program 21 is rewritten to the branching prediction bit set at step S1405 or step S1406 (step S1408). On the other hand, if these branching prediction bits match (step S1407: YES), then the branching prediction bit is not rewritten.

The branch number k is incremented (step S1409) and determination is made of whether the value of k has reached [n+1] (step S1410). Until k reaches [n+1], the steps S1403 to S1410 are repeated. If k has reached [n+1] (step S1410: YES), then the output unit 46 outputs the post-conversion object program 29 and the statistical-information output unit 47 outputs the statistical information 32 (step S1411) and the processing for rewriting branching prediction bit is finished.

Figure 15:
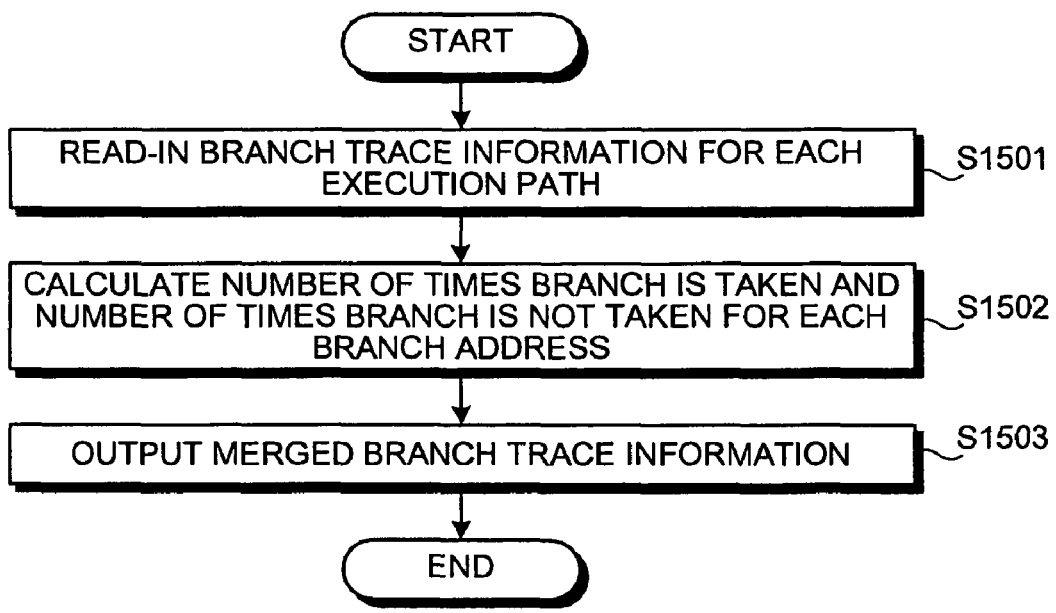
FIG. 15 is a flowchart of a merging processing procedure.

FIG. 15 is a flowchart of a processing procedure for merging the branch trace information. As shown in FIG. 15, with the start of the processing procedure to merge the branch trace information, the branch trace merging tool 12 reads in the branch trace information 24, 25, and 26 (see FIG. 2) for the execution paths, respectively (step S1501). The branch trace merging tool 12 merges the branch trace information read-in.

Specifically, the number of times the branch is taken at the same branch address is summed. Likewise, the number of times the branch is not taken is summed (step S1502), enabling an average branching ratio to be obtained from the branch trace information obtained for each of the execution paths. The greater the volume of branch trace information to be merged, the better the branching accuracy is at each branch instruction. The branch trace information obtained by merging is output (step S1503) and the processing to merge the branch trace information is finished.

In merging the branch trace information, the number of times the branch is taken and the number of times the branch is not taken may be simply summed. However, configuration may be such that for each piece of branch trace information, a calculating equation is defined that corresponds to program characteristics, such as meaning and execution frequency, and weighted addition is performed. For example, with respect to the first branch trace information, the second branch trace information, and the m-th branch trace information, if the number of times the branch is taken (or the number of times the branch is not taken) are given as BR1, BR2, and BRm, respectively, where respective weighting coefficients are C1, C2, and Cm, respectively and the number of pieces of data is given as j, the number of times the branch is taken (or the number of times the branch is not taken) C of the branch trace information after the weighting may be obtained by the following equation (5).

$$C = \Sigma Cm \times BRm, \text{ where } m = 1, 2, \ldots, j \quad (5)$$

FIG. 16 depicts an example of the branch trace information 27 obtained by merging the first branch trace information 24 and the second branch trace information 25. Although usually, the weighting coefficient C1 of the first branch trace information 24 and the weighting coefficient C2 of the second branch trace information 25 are both 1, here, description is made of the case in which C1 is 1 and C2 is 2, corresponding to the case where the value of the second branch trace information 25 is defined as being greater than that of the first branch trace information 24, in the applicable program. In this case, the number of times the branch is taken (or the number of times the branch is not taken) C of the branch trace information 27 after merging may be obtained by equation (6).

$$C = BR1 + 2 \times BR2 \quad (6)$$

Figure 17:
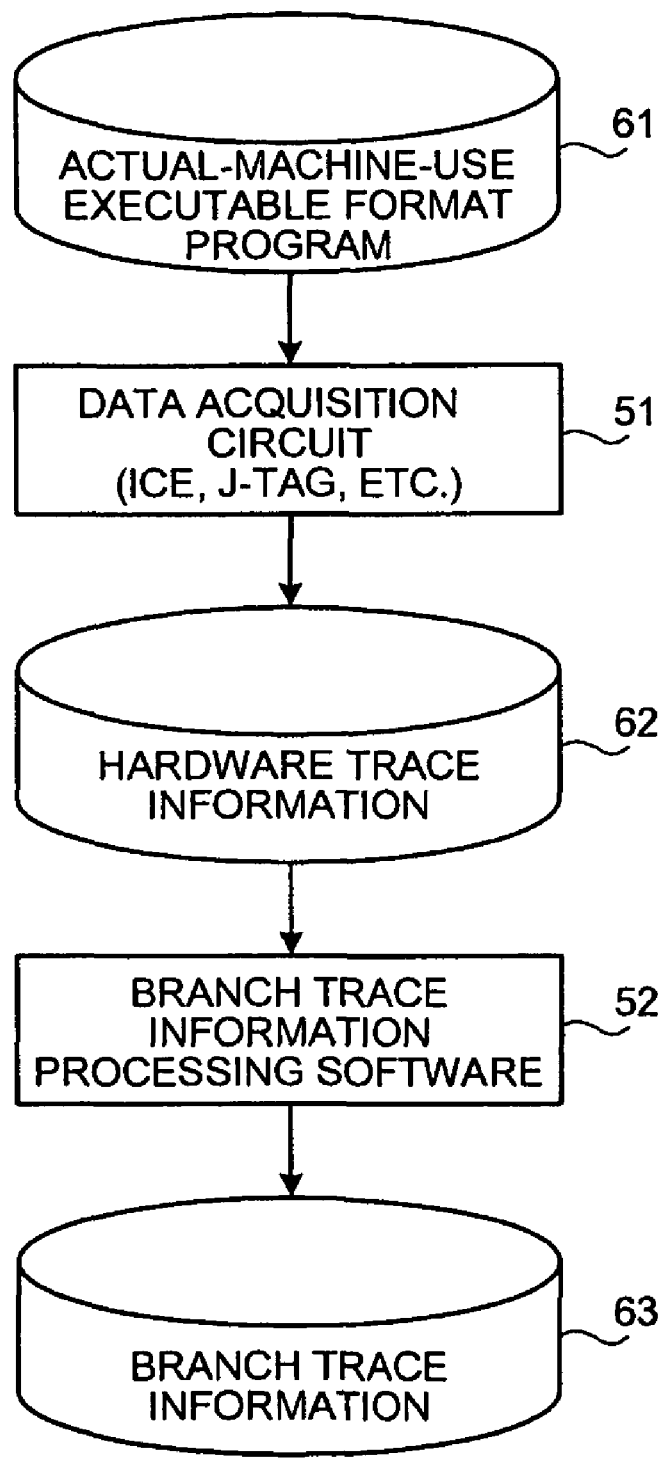
FIG. 17 is a diagram of a functional configuration of a device that acquires the branch trace information in an actual machine environment.

In the case of a machine equipped with the built-in system, the branch trace information may also be obtained in the actual machine environment. FIG. 17 is a diagram of a functional configuration of a device that acquires the branch trace information in the actual machine environment. As shown in FIG. 17, this device includes a data acquisition circuit 51, such as ICE and J-TAG, and branch trace information processing software 52. The data acquisition circuit 51 and the branch trace information processing software 52 function as a branch trace information acquiring unit.

Figure 18:
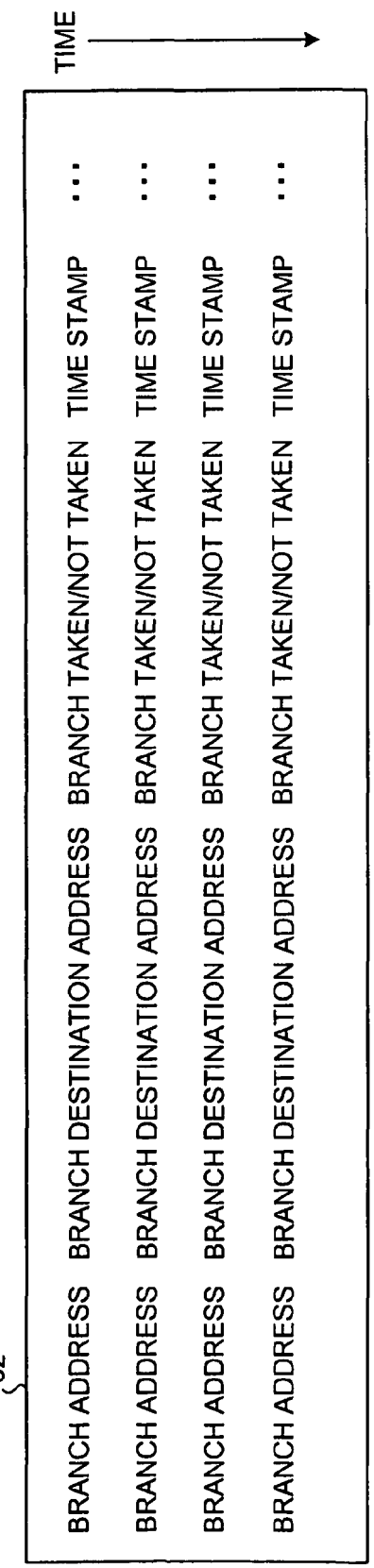
FIG. 18 depicts an example of time-series hardware trace information.

The data acquisition circuit 51 acquires time-series hardware trace information 62 from the actual machine (hardware) when the actual-machine-use executable format program 61 is executed on the actual machine. Acquisition of the time-series hardware trace information from the hardware is disclosed in Japanese Patent Application Laid-Open Publication No. 1982-124088 or Japanese Patent Publication No. 3909080. Therefore, here, assuming utilization of the technology disclosed in these publications, description thereof is omitted herein. The branch trace information processing software 52 acquires the number of times the branch is taken and the number of times the branch is not taken, based on the time-series hardware trace information 62 and prepares the branch trace information 63. FIG. 18 depicts an example of the time-series hardware trace information.

Figure 19:
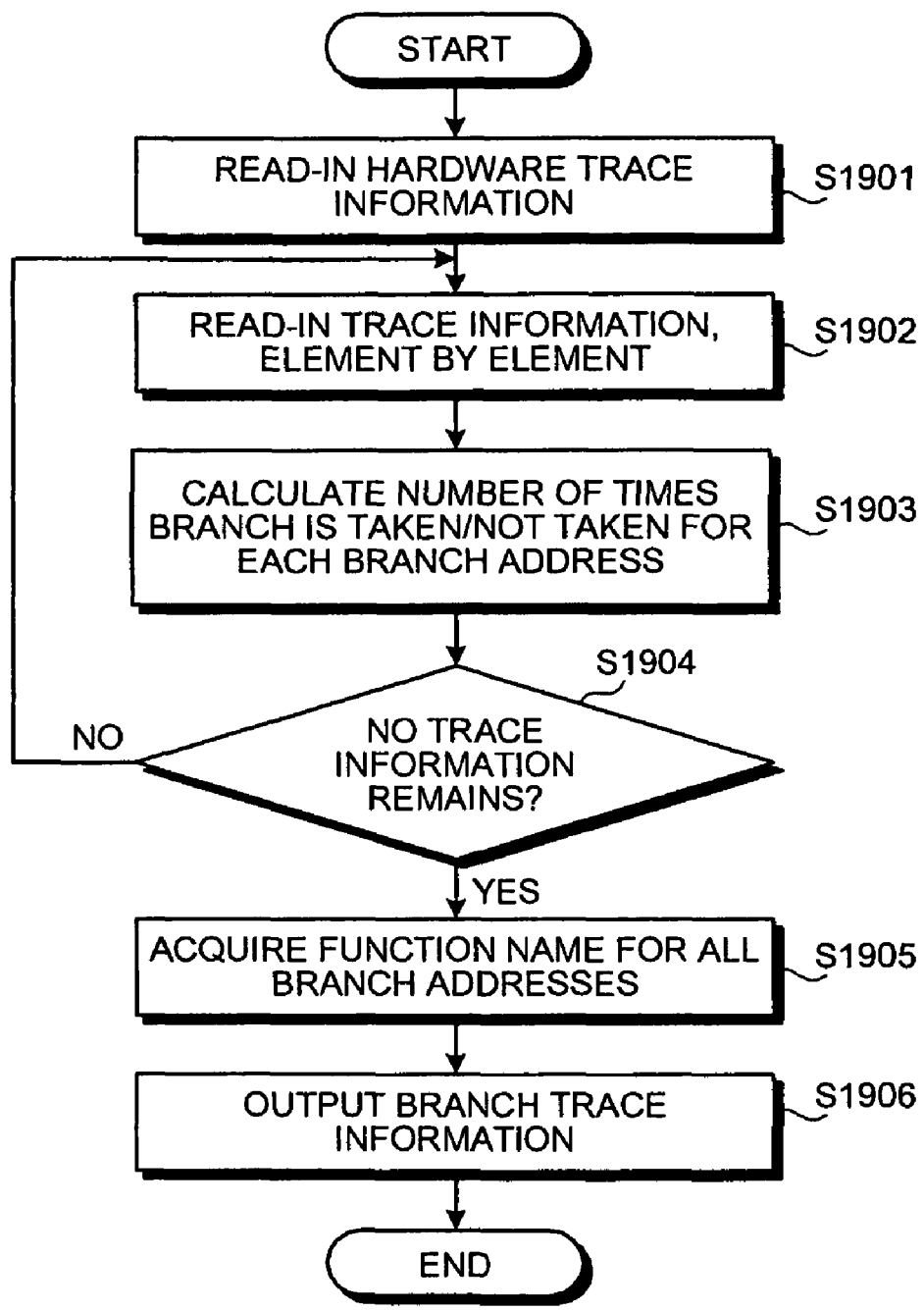
FIG. 19 is a flowchart of a processing procedure for outputting branch trace information.
Figure 20:
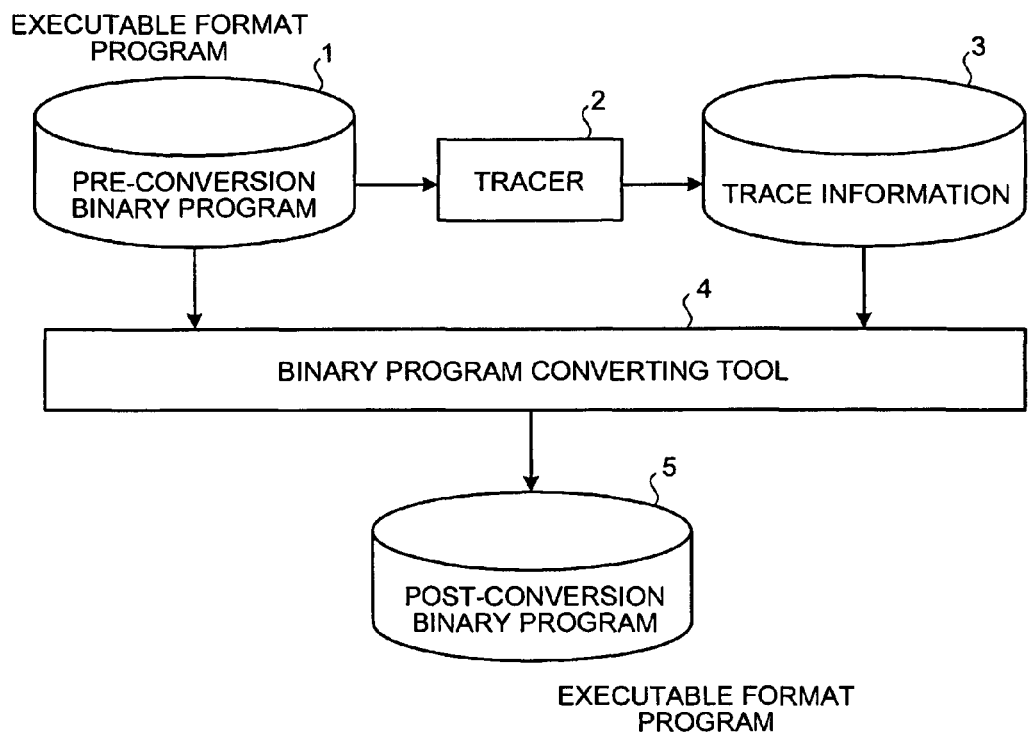
FIG. 20 is a diagram of a configuration of a conventional binary program converting apparatus.

FIG. 19 is a flowchart of a processing procedure for outputting branch trace information by the branch trace information processing software. As shown in FIG. 19, with the start of the processing for outputting branch trace information by the branch trace information processing software 52, the time-series hardware trace information 62 that is output from the data acquisition circuit 51 is read in (step S1901). The trace information is read in, element by element (step S1902). The number of times the branch is taken and the number of times the branch is not taken are obtained for each branch address (step S1903).

The presence or absence of the trace information is determined (step S1904) and as long as trace information not yet read-in remains (step S1904: NO), steps S1902 to S1904 are repeated. If there is no trace information that has not yet been read-in (step S1904: YES), then, all branch addresses are compared with symbol address information of the actual-machine-use executable format program 61 and corresponding function names are obtained (step S1905). The branch trace information 63 is output (step S1906) and the processing by the branch trace information processing software is finished. As described above, also by using the branch trace information 63 obtained from the actual machine environment, the post-conversion object program 29 may be obtained by rewriting the branching prediction bit of the pre-conversion object program 21 in the same manner as in the case of obtaining the branch trace information 27 by the simulator 15.

As described above, according to the embodiments, as the branching prediction bit of the conditional branch instruction in the pre-conversion object program 21 is merely rewritten, the code size does not expand. Even if the executable format of the actual-machine-use executable format program 31 is different from that of the simulator-use executable format program 23, since the branching prediction bit of the conditional branch instruction of the pre-conversion object program 21 is rewritten based on the branch trace information obtained from the simulator 15, the actual-machine-use executable format program 31, in which the branching prediction bit of the conditional branch instruction is rewritten, may be obtained. Therefore, as application in the built-in system having severe capacity restrictions is also possible, the branching prediction bit of the conditional branch instruction of the binary program to be executed in the built-in system can be rewritten.

According to the embodiments, as the branch taken/not taken situation of the conditional branch instruction is reflected for plural execution paths, the rewriting of the branching prediction bit of the conditional branch instruction of the binary program is possible such that the branch prediction of the branch instruction executable in plural execution paths is made using an average probability that takes the plural execution paths into account. Furthermore, according to the embodiments, not only is the branch taken/not taken situation of the conditional branch instruction reflected, but the branch penalty is also reflected, thereby enabling the rewriting of the branching prediction bit of the conditional branch instruction of the binary program such that the branch penalty is decreased.

Further, because the branching prediction bit of the conditional branch instruction is simply rewritten, program quality does not deteriorate and safety is secured. By processing the simpler binary program rather than processing the source code program, new functions may be utilized easily. A program user may generate and use a new binary program without waiting for retranslating work by the developer. Without appropriate management of the source code, the retranslating work may not performed or a great risk is involved; however, such inconvenience is not caused according to the embodiments.

Since the branching prediction bit of the object program is merely rewritten, the trouble of newly obtaining the branch trace information for each of various executable formats of the executable format program can be avoided. The object program may be processed irrespective of the environment, i.e., that of the actual machine or the simulator. Since the statistical information is output, the result of conversion of the binary program may be reflected backward on the source code program. By reflecting the conversion result on the source code program, porting to another platform as well may be made at the source code level.

The method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A program converting apparatus including a processor comprising:
    a data acquisition unit that executes a first executable format program generated using a pre-conversion object program and acquires branch trace information, indicating, for each of a conditional branch instruction, the number of times the conditional branch instruction is taken and the number of times the conditional branch instruction is not taken;
    a converting unit that, based on the branch trace information, generates a post-conversion object program, wherein a branching prediction bit of the conditional branch instruction of the pre-conversion object program is rewritten;
    a generating unit that generates a second executable format program, using the post-conversion object program; and
    a merging unit that sums, for plural execution paths of the conditional branch instruction, the number of times the conditional branch instruction is taken and the number of times the conditional branch instruction is not taken, respectively, to merge the branch trace information.

2. The program converting apparatus according to claim 1, comprising
a locating unit that obtains a relative address of the conditional branch instruction in the pre-conversion object program from a difference of a physical address of the conditional branch instruction in the first executable format program and an offset address of the pre-conversion object program in the first executable format program, and determines an instruction identified by the relative address as an object of branching prediction bit rewriting.

3. The program converting apparatus according to claim 1, wherein the converting unit rewrites the branching prediction bit of the conditional branch instruction of the pre-conversion object program, based on branch penalty for branch prediction failure.

4. The program converting apparatus according to claim 1, wherein the merging unit merges the branch trace information by creating an average branching ratio for each of the plural execution paths based on a sum of the number of times the conditional branch instruction is taken and a sum of the number of times the conditional branch instruction is not taken.

5. A program converting method comprising:
generating a post-conversion object program, based on branch trace information indicating, for each of a conditional branch instruction, the number of times the conditional branch instruction is taken and the number of times the conditional branch instruction is not taken wherein a branching prediction bit of a conditional branch instruction of a pre-conversion object program is rewritten;
generating an executable format program, using the post-conversion object program; and
summing, for plural execution paths of the conditional branch instruction, the number of times the conditional branch instruction is taken and the number of times the conditional branch instruction is not taken, respectively.

6. The program converting method according to claim 5, wherein the merging includes applying weight corresponding to execution frequency of the execution paths of the conditional branch instruction.

7. The program converting method according to claim 5, wherein the generating the post-conversion object program comprises
generating a simulator-use executable format program by linking the pre-conversion object program and a simulator-use object program;
executing the simulator-use executable format program on a simulator; and
generating the branch trace information.

8. The program converting method according to claim 7, wherein the generating the post-conversion object program comprises
obtaining a relative address of the conditional branch instruction in the pre-conversion object program from a difference of a physical address of the conditional branch instruction in the simulator-use executable format program and an offset address of the pre-conversion object program in the simulator-use executable format program; and
rewriting the branching prediction bit when an instruction identified by the relative address is the conditional branch instruction.

9. The program converting method according to claim 5, wherein the generating the post-conversion object program comprises
executing the executable format program on a built-in system; and
generating the branch trace information.

10. The program converting method according to claim 9, wherein the generating the post-conversion object program comprises
obtaining a relative address of the conditional branch instruction in the pre-conversion object program from a difference of a physical address of the conditional branch instruction in the executable format program and an offset address of the pre-conversion object program in the executable format program; and
rewriting the branching prediction bit when an instruction identified by the relative address is the conditional branch instruction.

11. The program converting method according to claim 5, wherein the generating the post-conversion object program includes rewriting the branching prediction bit of the conditional branch instruction of the pre-conversion object program, based on branch penalty for branch prediction failure.

12. The program converting method according to claim 11, wherein the branch penalty is a value inherent in a processor that executes the executable format program.

13. The program converting method according to claim 5, comprising merging the branch trace information by creating an average branching ratio for each of the plural execution paths based on a sum of the number of times the conditional branch instruction is taken and a sum of the number of times the conditional branch instruction is not taken.

14. A computer-readable recording medium that stores therein a computer program that causes a computer to execute the computer program comprising:
generating a post-conversion object program, based on branch trace information concerning branch-taking with respect to a conditional branch instruction, wherein a branching prediction bit of a conditional branch instruction of a pre-conversion object program is rewritten;
generating an executable format program, using the post-conversion object program; and
summing, for plural execution paths of the conditional branch instruction, the number of times the conditional branch instruction is taken and the number of times the conditional branch instruction is not taken, respectively.

15. The computer-readable recording medium according to claim 14, comprising:
generating a simulator-use executable format program by linking the pre-conversion object program and a simulator-use object program;
executing the simulator-use executable format program on a simulator; and
generating the branch trace information.

16. The computer-readable recording medium according to claim 14, comprising:
executing the executable format program on a built-in system; and
generating the branch trace information.

17. The computer-readable recording medium according to claim 14, wherein the generating the post-conversion object program includes rewriting the branching prediction bit of the conditional branch instruction of the pre-conversion object program, based on branch penalty for branch prediction failure.

18. The computer-readable recording medium according to claim 14, comprising merging the branch trace information by creating an average branching ratio for each of the plural execution paths based on a sum of the number of times the conditional branch instruction is taken and a sum of the number of times the conditional branch instruction is not taken.

* * * * *